United States Patent [19]
Fukuchi et al.

[11] Patent Number: 5,951,618
[45] Date of Patent: *Sep. 14, 1999

[54] DETECTOR DEVICE FOR COMBUSTION STATE IN INTERNAL COMBUSTION ENGINE

[75] Inventors: Eisaku Fukuchi, Hitachi; Akihito Numata, Ibaraki-ken; Takanobu Ichihara, Hitachinaka; Toshio Ishii, Mito, all of Japan

[73] Assignees: Hitachi, Ltd.; Hitachi Car Engineering Co., Ltd., both of Japan

[ * ] Notice: This patent is subject to a terminal disclaimer.

[21] Appl. No.: 09/170,196

[22] Filed: Oct. 13, 1998

Related U.S. Application Data

[63] Continuation of application No. 08/704,368, Aug. 28, 1996, Pat. No. 5,828,976.

[30] Foreign Application Priority Data

Sep. 4, 1995 [JP] Japan ................................. 7-226831

[51] Int. Cl.$^6$ .................................................. G01M 15/00
[52] U.S. Cl. ........................... 701/110; 73/116; 73/117.3; 123/419; 123/436
[58] Field of Search .................................. 73/116, 117.2, 73/117.3; 123/419, 425, 436; 701/110, 111

[56] References Cited

U.S. PATENT DOCUMENTS

| | | | |
|---|---|---|---|
| 5,095,742 | 3/1992 | James et al. ............................... | 73/116 |
| 5,263,453 | 11/1993 | Wakahara et al. ....................... | 123/436 |
| 5,301,546 | 4/1994 | Inada et al. ............................. | 73/117.3 |
| 5,307,671 | 5/1994 | Akase ..................................... | 73/117.3 |
| 5,361,629 | 11/1994 | McCombie ............................. | 73/117.3 |
| 5,377,537 | 1/1995 | James ..................................... | 73/117.3 |
| 5,452,604 | 9/1995 | Namiki et al. .......................... | 701/111 |
| 5,528,929 | 6/1996 | Ikebuchi ................................... | 73/116 |
| 5,828,976 | 10/1998 | Fukuchi et al. ......................... | 701/110 |

FOREIGN PATENT DOCUMENTS

58-51243  3/1983  Japan .

*Primary Examiner*—George Dombroske
*Attorney, Agent, or Firm*—Evenson, McKeown, Edwards & Lenahan, P.L.L.C.

[57] ABSTRACT

It is intended to detect combustion state of an internal combustion engine over the entire range where positive torque is generated. Time required from a predetermined first crank angle to a second crank angle is measured by detecting a rotation angle of a ring gear or plate with engine speed detecting means 101. Then, a combustion state parameter is calculated from said required time by combustion state detecting means 102 with an established calculation method, and combustion state is determined by combustion state judging means 103. Engine speed correction means 104 determines and feeds back a correction value for the combustion state detecting value to correct the engine speed. At the moment, the correction quantity for correcting the required time is varied so that the normal combustion value of said combustion state parameter is at a predetermined value or less, or within a predetermined range. When the combustion state parameter reaches a value indicating misfire, update of the correction value is inhibited for a prescribed duration before and after it.

20 Claims, 13 Drawing Sheets

FIG.10A  5000rpm  NO LOAD

(a) COMBUSTION STATE PARAMETER (CONVENTIONAL PROCESS)

(b) COMBUSTION STATE PARAMETER (PRESENT PROCESS)

(c) PITCH ERROR COEFFICIENT

ENGINE SPEED
WITHOUT PITCH ERROR FEEDBACK

FIG.12B

ENGINE SPEED
WITH PITCH ERROR FEEDBACK

DETECTOR DEVICE FOR COMBUSTION STATE IN INTERNAL COMBUSTION ENGINE

This application is a continuation of application Ser. No. 08/704,368, U.S. Pat. No. 5,828,976, filed Aug. 28, 1996.

BACKGROUND OF THE INVENTION

The present invention relates to a detector device for combustion state in an internal combustion engine, and, more particularly, to a detector device for combustion state in an internal combustion engine which enables it to detect misfire over the entire operating range where the internal combustion engine generates positive torque.

Conventionally, technique has been known that indirectly detects misfire by measuring the engine speed utilizing the relationship between torque generated by combustion of an engine and the engine speed in order to detect operating condition. Examples of such technique include Japanese Patent Unexamined Publication No. 58-51243. This technique is to detect the engine speed at least two points in one ignition cycle from the previous ignition to the current ignition, to determine a variation in the engine speed in the one ignition cycle from the difference of the engine speed, to statistically process the sequentially determined variations in the engine speed, and to determine the combustion state of the internal combustion engine by using the result of process.

The approach for determining the combustion state of the internal combustion engine by detecting the engine speed is performed by detecting a rotation angle of a ring gear or plate mounted on a crank shaft. However, experiments by the inventors revealed that, although the approach was effective in a relatively low rotation range, it suffered from difficulty in properly judging the combustion state in the internal combustion engine in a high rotation range because dispersion in error in manufacturing pitch of the ring gear or plate became significant in the high rotation range, and influence of such pitch error became high.

SUMMARY OF THE INVENTION

Thus, the present invention is intended to provide a detector device for combustion state in an internal combustion engine in a manner that the combustion state in the internal combustion engine is judged by detecting the engine speed, the device enabling it to perform proper judgment over the entire range (including a high rotation range) where positive torque is generated, and, more particularly, to surely detect misfire condition over the entire range (including a high rotation range).

To attain the above problems, the combustion state detector device according to the present invention is basically a detector device for combustion state in an internal combustion engine which detects misfire conditions in the internal combustion engine with a combustion state parameter calculated from a time signal for time when a crank shaft rotates in a predetermined angle, the detector device comprising means for calculating correction quantity for correcting the time signal from variation in the normal combustion value of the combustion state parameter, means for correcting the time signal with the correction quantity, and means for calculating the combustion state by using the corrected time signal.

In other words, in this device, a signal from a sensor mounted for detecting the rotation angle of the ring gear or plate is supplied to an internal combustion engine controller, time required from a first predetermined crank angle to a second crank angle being measured, the combustion state parameter being calculated from the required time by a predetermined calculation method.

Then, preferably, a standard cylinder is established, and, when the normal combustion value of the combustion state parameter for a cylinder group consisting of the standard cylinder and an opposite cylinder is at a predetermined value or less, and the normal combustion value of the combustion state parameters for other cylinder groups is at the predetermined value or more, the correction value for correcting the time signal for the other cylinder groups is decreased, and otherwise, it is increased. Then, the time signal is corrected with the correction quantity, and the combustion state parameter is recalculated by using the corrected time signal. In addition, it is a preferable aspect of the present invention that, when the combustion state parameter becomes a value indicating a specific combustion state (for example, misfire), update of the correction value is inhibited for a prescribed duration before and after it.

The above process by using the detector device for combustion state in the internal combustion engine apparently improves the signal/noise (S/N) ratio of the combustion state parameter. Although description is given in the following by assuming "S" (signal) in the S/N ratio results from misfire, the present invention is also applicable even if it results from other factors.

In this case, "S" (signal) in the S/N ratio cannot be detected unless misfire is intentionally caused. However, since "N" (noise level) can be always detected, the present invention employs such approach to make "N" as low as possible to improve the unknown S/N ratio. To accomplish such approach, the correction value for correcting the required time is changed until the noise level of the combustion state parameter becomes a predetermined value or less. Correcting the required time means to reduce dispersion of pitch error of the ring gear or plate by cylinder, so that the S/N ratio of the calculated combustion state parameter would be improved.

The control method in the detector device for combustion state in an internal combustion engine according to the present invention may be said to be a feedback method continuously changing the correction quantity with the noise level of the combustion state parameter as correction for the pitch error between the cylinders.

DESCRIPTION OF THE PREFERRED EMBODIMENTS

Now, the combustion state detector device for an internal combustion engine according to the present invention and a detection method using it are described in detail with reference to embodiments.

Figure 1:
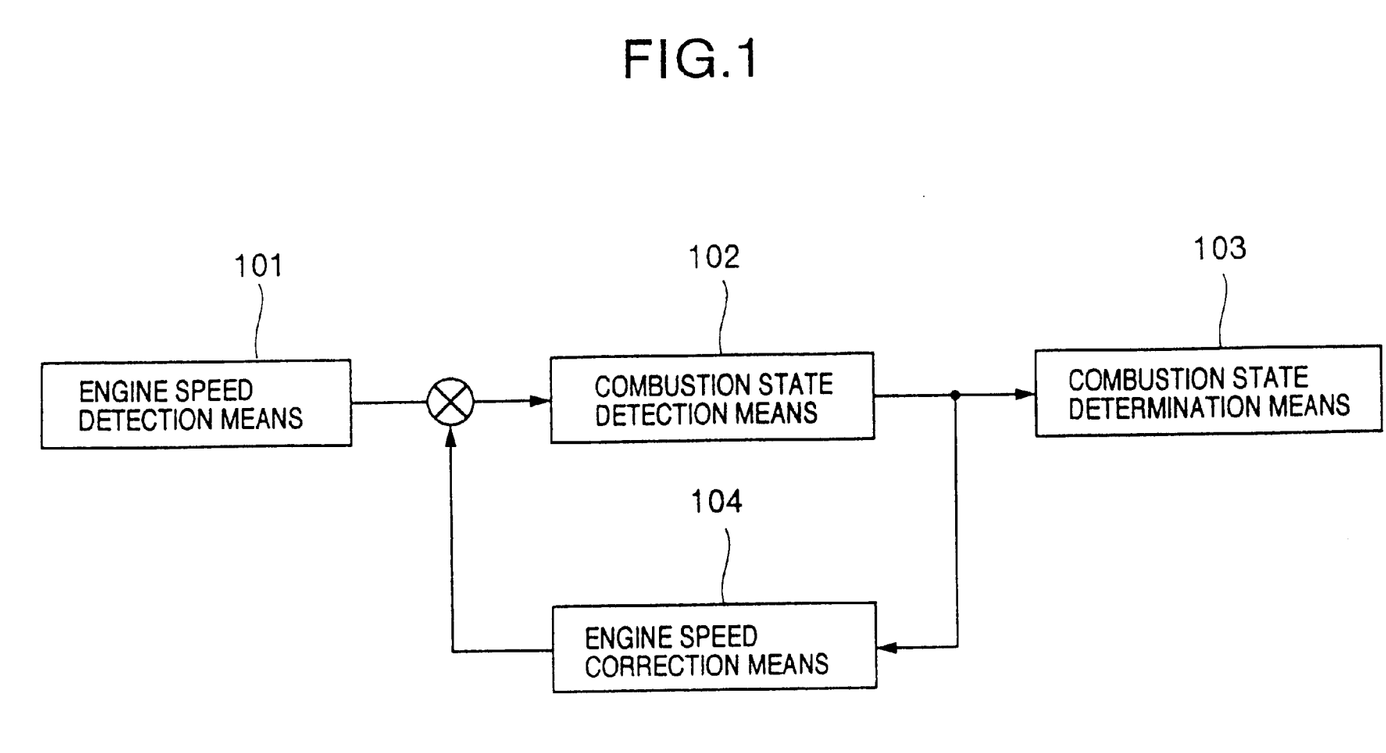
FIG. 1 is a block diagram illustrating a combustion state detector device for an internal combustion engine according to the present invention.

The control process by the combustion state detector device for an internal combustion engine according to the present invention is shown in FIG. 1 in a form of block diagram. As shown in the figure, engine speed detection means of block 101 detects the engine speed, while combustion state detection means of block 102 detects the combustion state. Then, combustion state determination means of block 103 judges the combustion state (existence of misfire in this case). Here, engine speed correction means of block 104 determines a correction value for correcting the engine speed from the combustion state detection means, and corrects the engine speed. This summarizes the arrangement of the combustion state detector device for an internal combustion engine according to the present invention.

Figure 2:
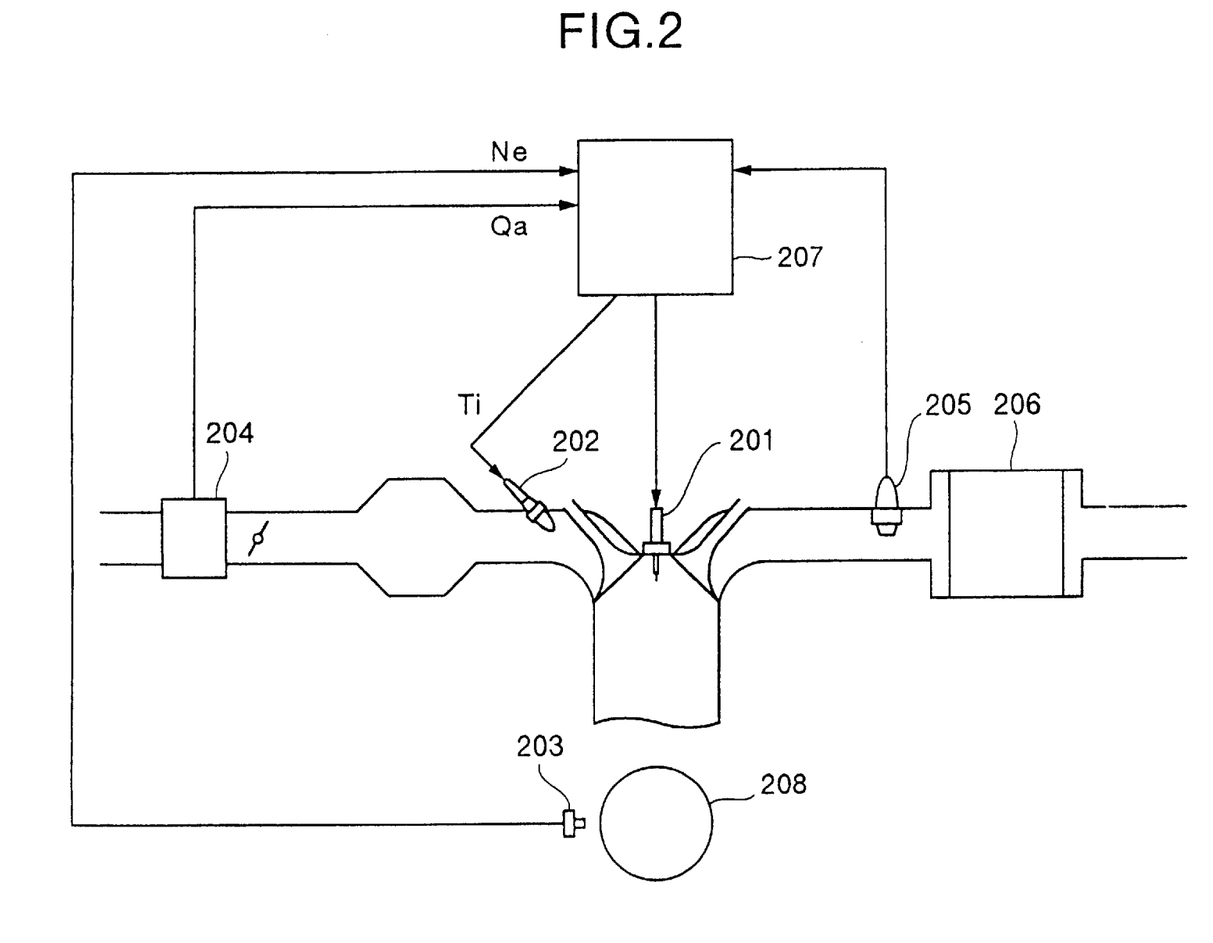
FIG. 2 is a diagram illustrating an internal combustion engine system to which the combustion state detector for an internal combustion engine is applied.

FIG. 2 shows an example of internal combustion systems to which the combustion state detector device according to the present invention is applied. The internal combustion engine system comprises an internal combustion engine, an air-intake system, and an exhaust system. The internal combustion engine is equipped with an ignition device 201, a fuel injection device 202, and engine speed detection means 203. In addition, the air-intake system is equipped with an air cleaner (not shown), and flow rate detection means 204, while the exhaust system is equipped with an air/fuel ratio sensor 205, and three-way catalyst 206.

An internal combustion engine controller 207 receives an output signal Qa from the flow rate detection means 204, and the number of rotation Ne of a ring gear or plate 208 from the engine speed detection means 203, calculates amount of fuel injection Ti, and controls the amount of fuel injection form an injector 202. The internal combustion engine controller 207 also performs air/fuel ratio feedback control by detecting the air/fuel ratio in the internal combustion engine from the air/fuel ratio sensor 205, and correcting the amount of fuel injection Ti to make air/fuel ratio in the internal combustion engine the theoretical air/fuel ratio.

Although, in the following description-on the embodiments, a four-cylinder engine is employed as an example of the internal combustion engine by referring its standard cylinder as the second cylinder, a cylinder opposing to it as the third cylinder, and non-opposing cylinders as the first and fourth cylinders, it is matter of course that the present invention is not limited to a four-cylinder engine.

Figure 3:
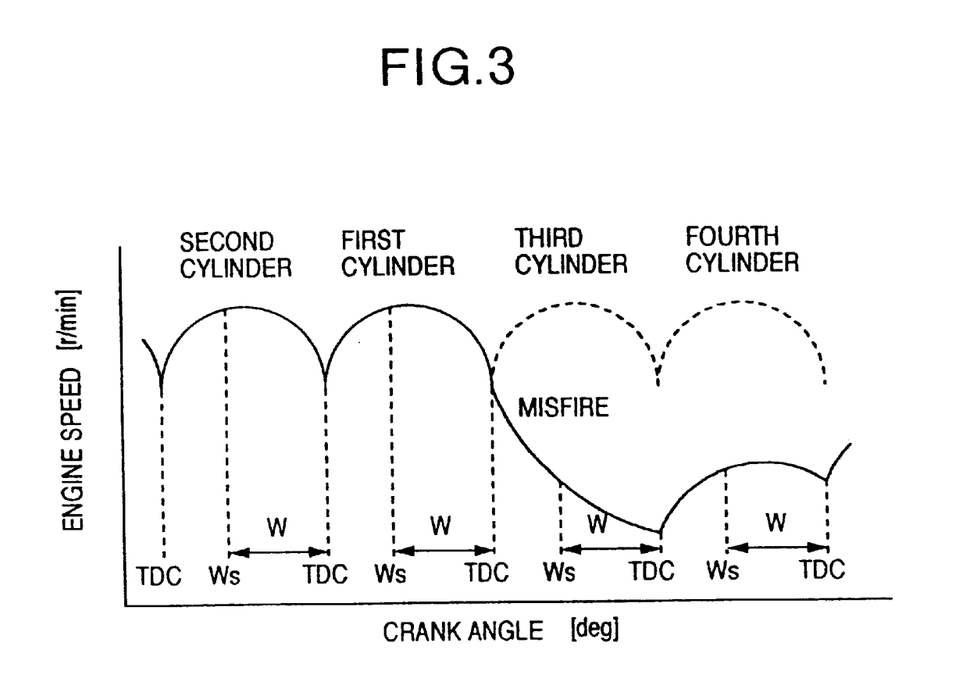
FIG. 3 is a graph showing variation in the engine speed when misfire occurs.

FIG. 3 shows an example of variation in the engine speed to the rotation angle of crank shaft of the four-cylinder engine, in which a slid line indicates a case where the third cylinder causes misfire, while a broken line indicates a normal combustion state. First, referring to FIG. 3, an interval for measuring the engine speed of each cylinder (hereinafter called "window W") is explained. TDC (top dead center) of each cylinder is detected by a reference signal REF. A first crank angle is determined by the TDC with using an angle signal POS to make it a window start point Ws. A second crank angle is determined by the window start point Ws also with using the angle signal POS to make the interval from the first crank angle to the second crank angle the window W.

Then, the time for passing the window of a cylinder in the present ignition cycle is assumed to be TDATA (n), and a combustion state parameter D1A is determined by Equation (1)

$$D1A = \frac{TDATA(n) - TDATA(n-1)}{TDATA(n-1)^3} \quad (1)$$

where,

D1A: combustion state parameter

TDATA (n): window passed time of a cylinder in the present ignition cycle

TDATA (n−1): window passed time of a cylinder in the preceding ignition cycle

In Equation 1, the combustion state parameter D1A indicates zero because the window passed time is equal to all cylinders when the combustion state is normal. When misfire occurs in the engine, since the misfired cylinder generates no torque, and the engine speed is lowered, the value of TDATA increases, and the combustion state parameter D1A has a positive value. Then, existence or absence of misfired cylinder can be detected by comparing the combustion state parameter D1A with a predetermined value. However, as described earlier, while this approach is effective in a relatively low rotation range, detection of an accurate value of the combustion state parameter D1A is difficult in the high rotation range because dispersion due to manufacturing error in pitch of the ring gear or plate becomes significant for each cylinder.

Figure 4A:
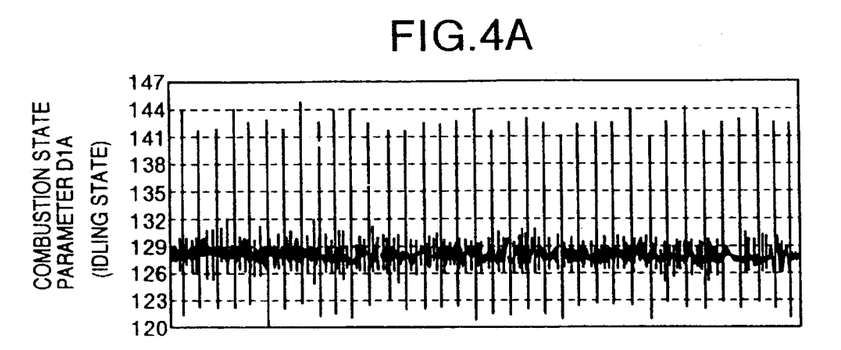
FIGS. 4A, 4B, and 4C are graphs showing detection of a combustion state parameter D1A in low and high engine speed states.
Figure 4B:
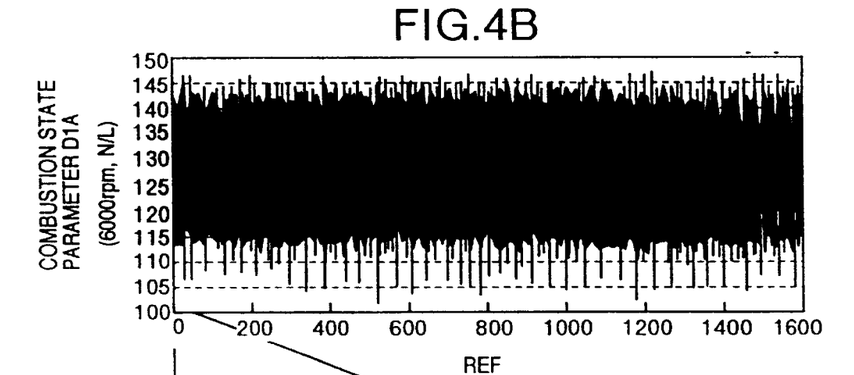

FIG. 4A shows the combustion state parameter D1A in the low rotation state (idling state), while FIG. 4B shows it in the high rotation state (6,000 rpm, N/L). Both are the combustion state parameter D1A when the second cylinder is caused to misfire once 40 ignitions. As seen from FIGS. 4A and 4B, when a determination level with a predetermined value is established for the low rotation state, misfire can be detected (very sharp high peaks in FIG. 4A indicate D1A at misfire). However, misfire cannot be detected in the high rotation state even if a determination level is appropriately established. For example, when the determination level is appropriately established to D1A=140, misfire can be perfectly detected in FIG. 4A, but it is impossible to establish a determination level enabling it to clearly isolate the misfire state from the normal state.

Figure 4C:
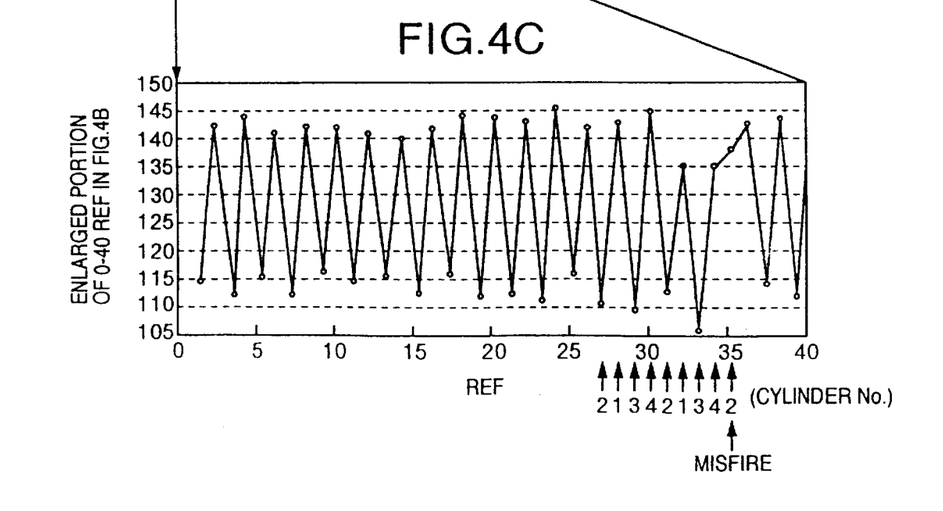

FIG. 4C is an enlargement of 40 ignitions in the high rotation state. It is found that the combustion state parameter D1A at misfire is completely masked by those at non-misfire. When the figure is carefully inspected, the combustion state parameters D1A for the first and fourth cylinders show a higher value, while those for the second and third cylinders show a lower value. This alternately appears so that the combustion state parameter D1A forms a belt-like shape. This is because the dispersion in pitch error of the plate becomes significant for the window passed time TDATA of the first and fourth cylinders, as well as the second and third cylinders at the high rotation.

Figure 5:
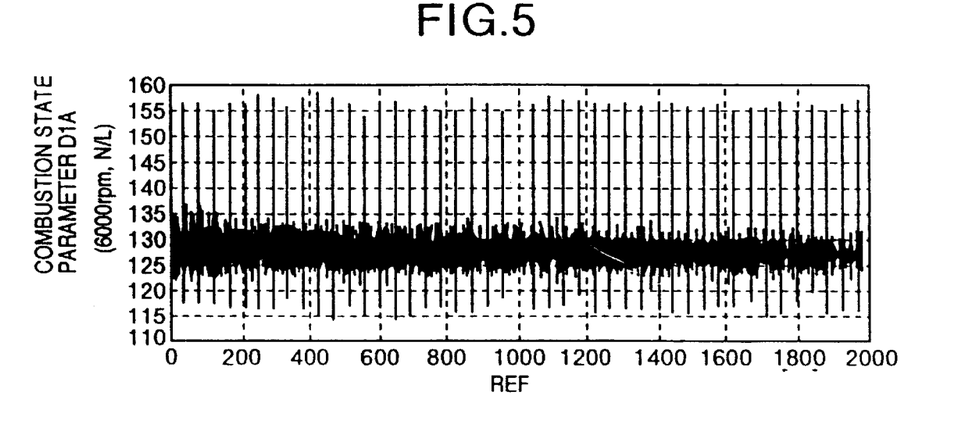
FIG. 5 is a graph showing detection of the combustion state parameter D1A in a high engine speed state when pitch error correction is applied.

Then, to correct the dispersion in pitch error of the plate, it is arranged to multiply TDATA of the first and fourth cylinders by a coefficient for matching the level of TDATA for the first and fourth cylinders to that of the second and third cylinders. This coefficient is hereinafter called a pitch error coefficient pec, and multiplying by the pitch error coefficient pec is called pitch error correction. FIG. 5 shows the combustion state parameter D1A when the pitch error coefficient pec is set to 0.999. From the figure, it is found that D1A at misfire significantly increases. Therefore, it is found that application of the pitch error correction enables it to establish a determination level which clearly isolates misfire from the normal state, and to detect misfire even at a high rotation state.

Figure 6:
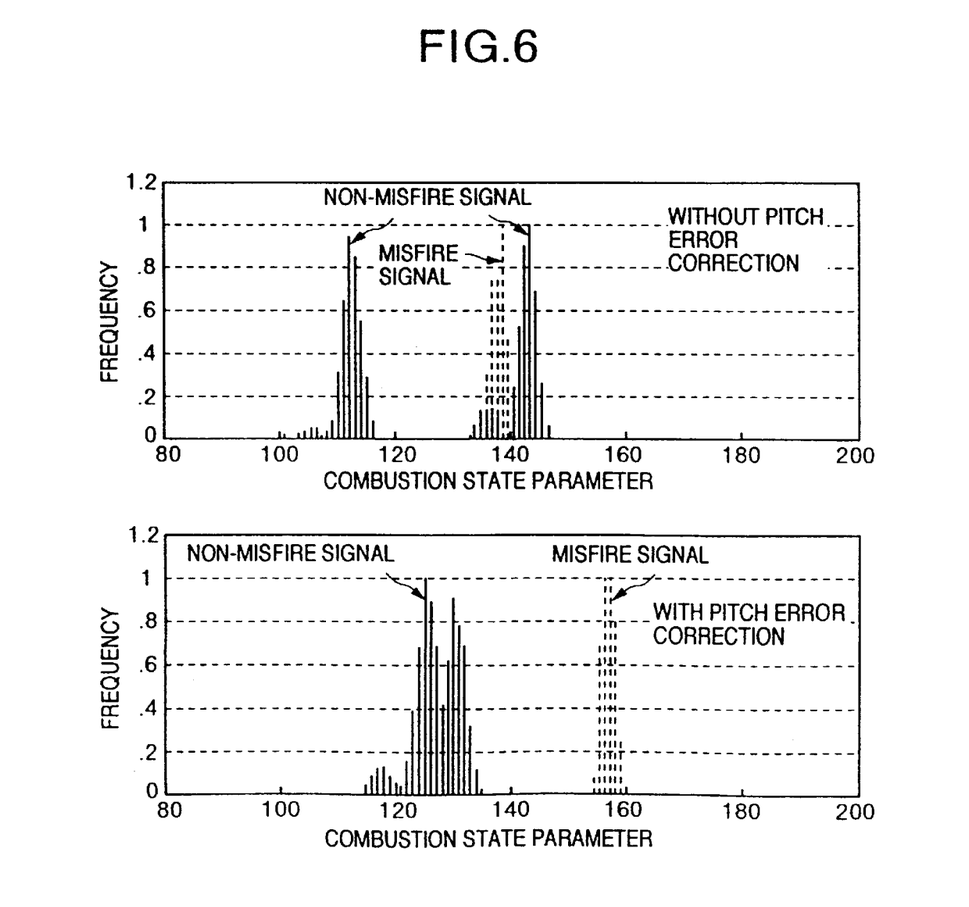
FIG. 6 is graphs showing distribution of the combustion state parameters D1A when the pitch error correction is applied and not applied.

Here, distribution charts of the combustion state parameters D1A when the pitch error correction is applied and not applied are shown in FIG. 6. A misfire signal when the pitch error correction is not applied is completely in the region of non-misfire signal, so that it is impossible to isolate and detect a misfire signal from a non-misfire signal. On the other hand, a misfire signal when the pitch error correction is applied forms a region clearly isolated from the region for non-misfire signal. Accordingly, in this case, a misfire signal can be completely isolated and detected from non-misfire signals. In other words, it is found that application of the pitch error correction makes it possible to isolate and detect existence of misfire from absence of it. Then, the S/N ratio is defined in Equation (2) to quantitatively evaluate the detection accuracy.

$$\text{S/N ratio} = \frac{(\text{average of } D1A \text{ with misfire} - \text{average of } D1A \text{ without misfire})}{(\text{standard deviation of } D1A \text{ with misfire} + \text{standard deviation of } D1A \text{ without misfire})} \quad (2)$$

When the S/N ratio when the pitch error correction is applied and that when the correction is not applied are calculated from Equation (2), Correction not applied: 0.63, and Correction applied: 4.78.

The S/N ratio can be considered that 1 means the detection accuracy of 70%, 2 means the detection accuracy of 95%, and 3 or more means the detection accuracy of 100%. Thus, application of the pitch error correction can provide the detection accuracy of 100%.

Now, the method for determining the pitch error coefficient pec is explained. While the pitch error coefficient is tentatively set to 0.999 in the above, this value is required to be found in the internal combustion engine controller. Ideally, an approach is considered to find the maximum value of S/N ratio by successively calculating the S/N ratio, and changing the pitch error coefficient pec so that the value of S/N ratio is maximized. However, in practice, it is impossible to forcedly cause misfire to find the S/N ratio. Then, the absolute level of noise is reduced as possible in a conception that, although the value of S/N ratio cannot be found, it is sufficient for the S/N ratio to be improved. That is, according to the present invention, the pitch error coefficient pec is varied so that the level of combustion state parameter D1A at non-misfire state (normal combustion value) is less than a predetermined value. Since variation of the combustion state parameter D1A to variation of the pitch error coefficient pec differs from a cylinder to another, it is recommended to perform the process at the level of non-misfire state (normal combustion value) for each cylinder.

Figure 7:
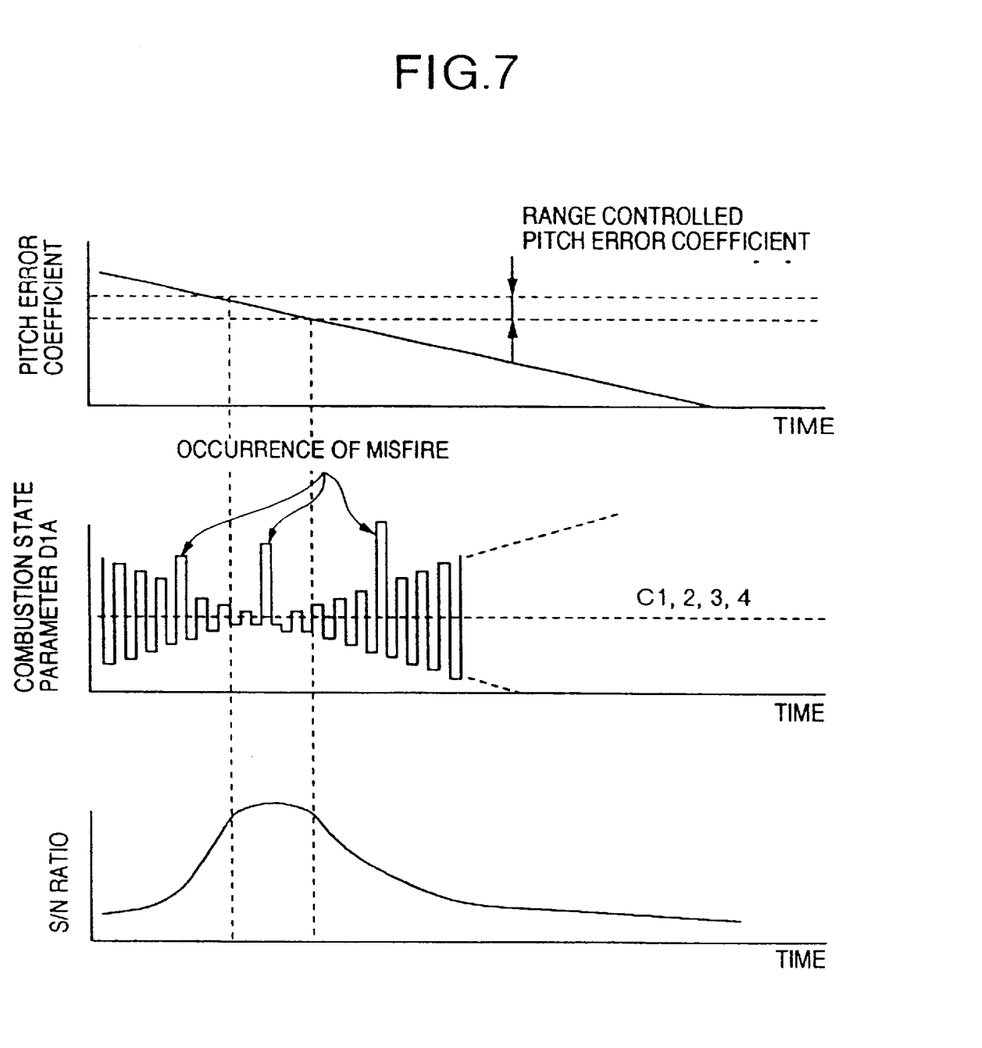
FIG. 7 is graphs showing variation of the combustion state parameter D1A when a pitch error coefficient pec is being lowered.
Figure 8:
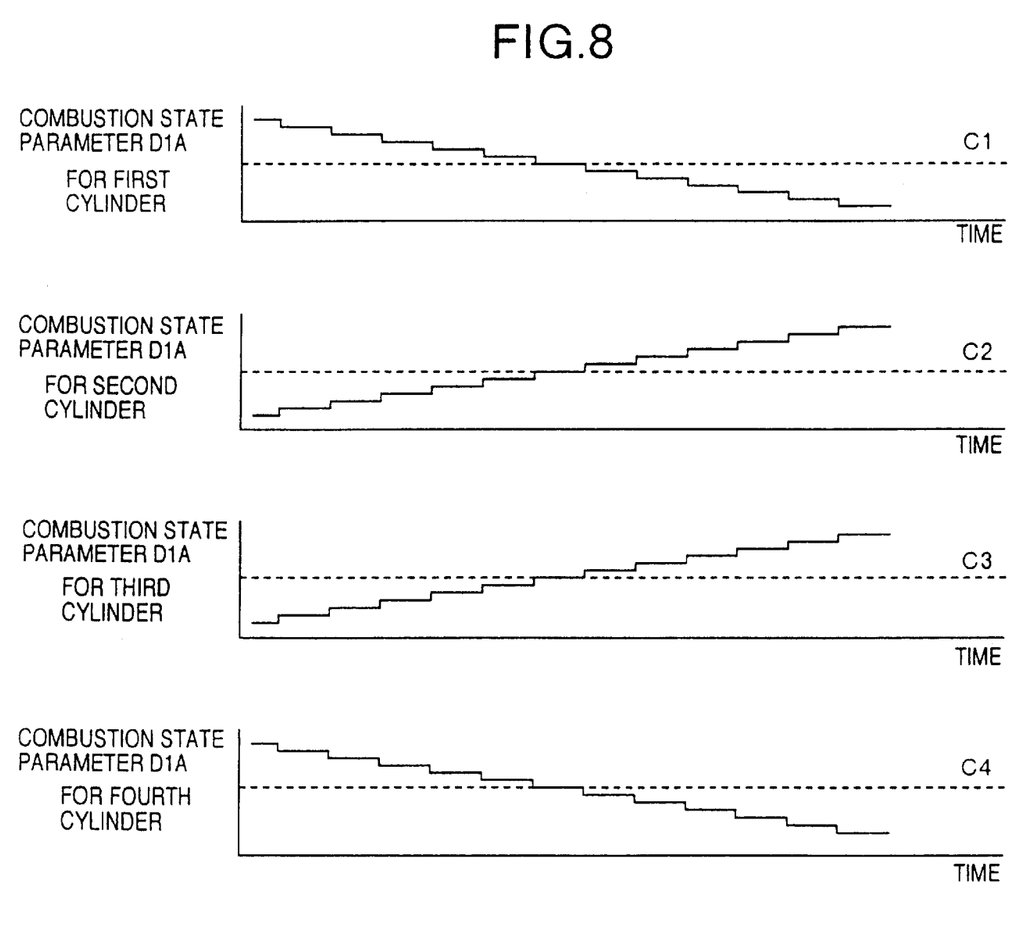
FIG. 8 is graphs showing the combustion state parameter for each cylinder when a pitch error coefficient pec is being lowered.

To describe the above in more detail, variation of the combustion state parameter D1A when the pitch error coefficient pec is gradually reduced is shown in FIG. 7. When the pitch error coefficient is reduced, the difference between the combustion state parameter D1A at misfire and that at non-misfire increases. When this is investigated for the S/N ratio calculated by Equation (2), it is observed the manner in which the S/N ratio gradually increases. However, if the pitch error coefficient is reduced too much, the difference between the combustion state parameter D1A at misfire and that at non-misfire again decreases, and the S/N ratio also decreases. Thus, it is necessary to control the pitch error coefficient at a point where the S/N ratio is maximized. Then, the pitch error coefficient is controlled by investigating the combustion state parameter D1A for each cylinder (FIG. 8) so that the combustion state parameter D1A for each cylinder is constant near a predetermined value, thereby the S/N ratio being maintained at a level where diagnosis can be performed.

Specifically, the pitch error coefficient pec is reduced when the combustion state parameter for the first cylinder D1A≧ the predetermined value, the combustion state parameter for the second cylinder D1A≦ the predetermined value, the combustion state parameter for the third cylinder D1A≦ the predetermined value, and the combustion state parameter for the fourth cylinder D1A≧ the predetermined value are all satisfied, otherwise, it is increased. This enables it to continuously maintain the S/N ratio which can be detected regardless of the operating range.

Figure 9:
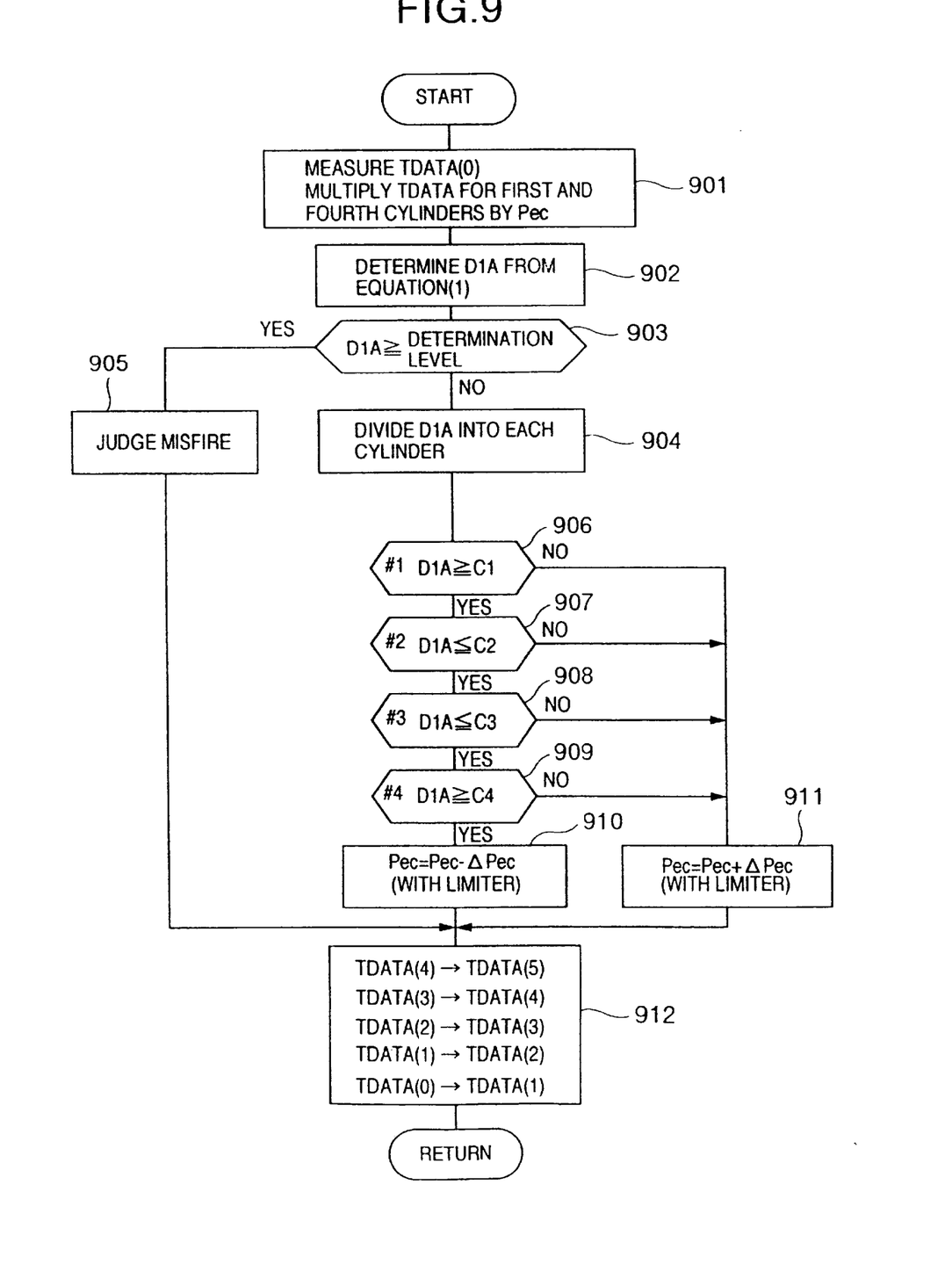
FIG. 9 is a flowchart illustrating a process for detecting misfire in an embodiment of the combustion state detector device for an internal combustion engine according to the present invention.

The above process is described on the basis of the flowchart shown in FIG. 9. The process is performed every ignition. In step 901, TDATA is measured, and TDATA for the first and fourth cylinders is multiplied by the pitch error coefficient pec. Then, in step 902, the combustion state parameter D1A is determined by Equation (1). Step 903 compares the combustion state parameter D1A with a misfire determination level, and does not update the pitch error coefficient pec when it is determined to be misfire (step 905). When it is determined not to be misfire in step 903, in step 904, the combustion state parameter D1A is divided into each cylinder. Then, if, in steps 906–909, the combustion state parameter for the first cylinder D1A≧C1, the combustion state parameter for the second cylinder D1A<C2, the combustion state parameter for the third cylinder D1A≦C3, and the combustion state parameter for the fourth cylinder D1A≧C4 are all satisfied, the pitch error coefficient pec is reduced (step 910), and, if any one of the conditions is not satisfied, the pitch error coefficient pec is increased (step 911). Finally, in step 912, TDATA is shifted by one sampling and stored in a buffer for the next calculation. The above process would be hereinafter called a pitch error-feedback process.

Figure 10A:
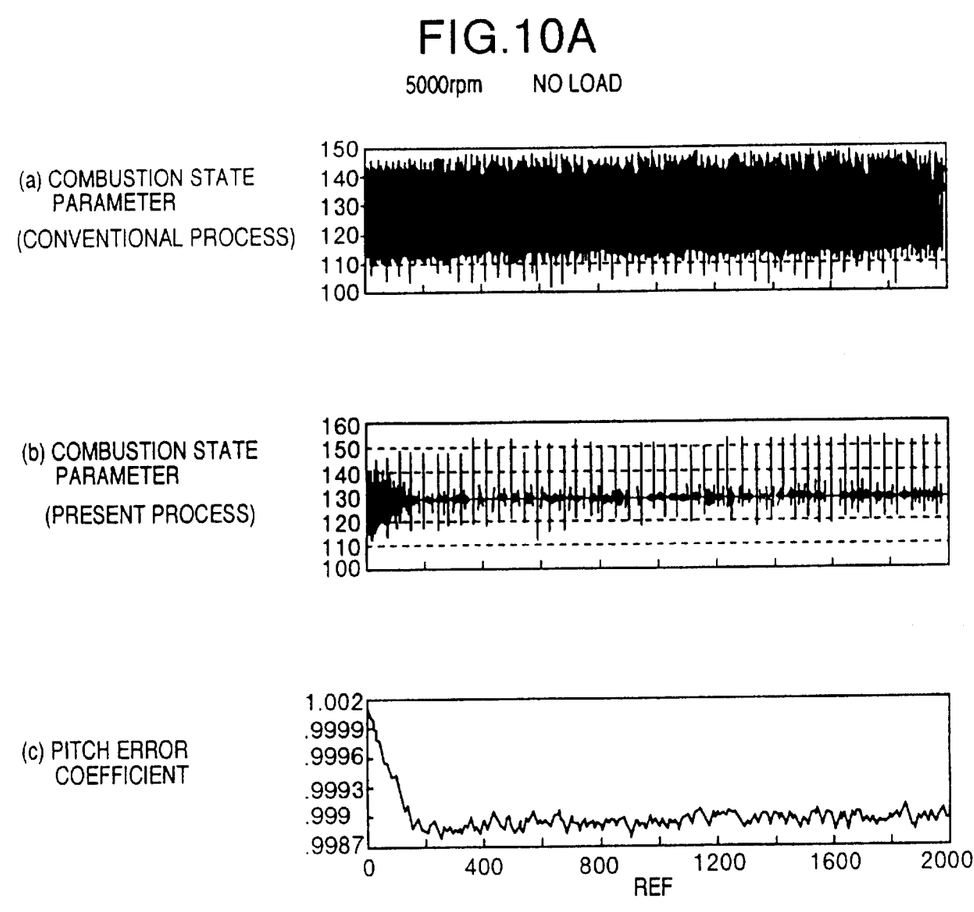
FIGS. 10A and 10B are graphs showing variation of the combustion state parameter D1A when pitch error feedback is applied to the combustion state parameter D1A in a high engine speed state.
Figure 10B:
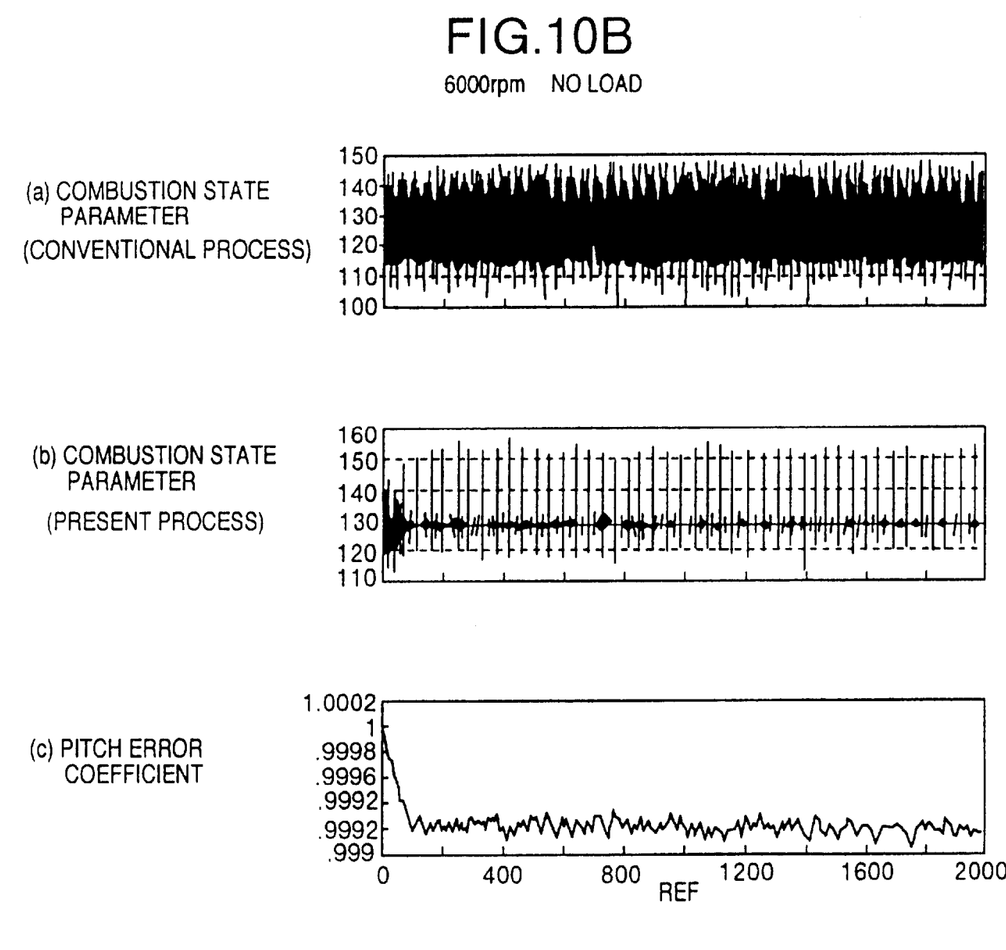
Figure 11:
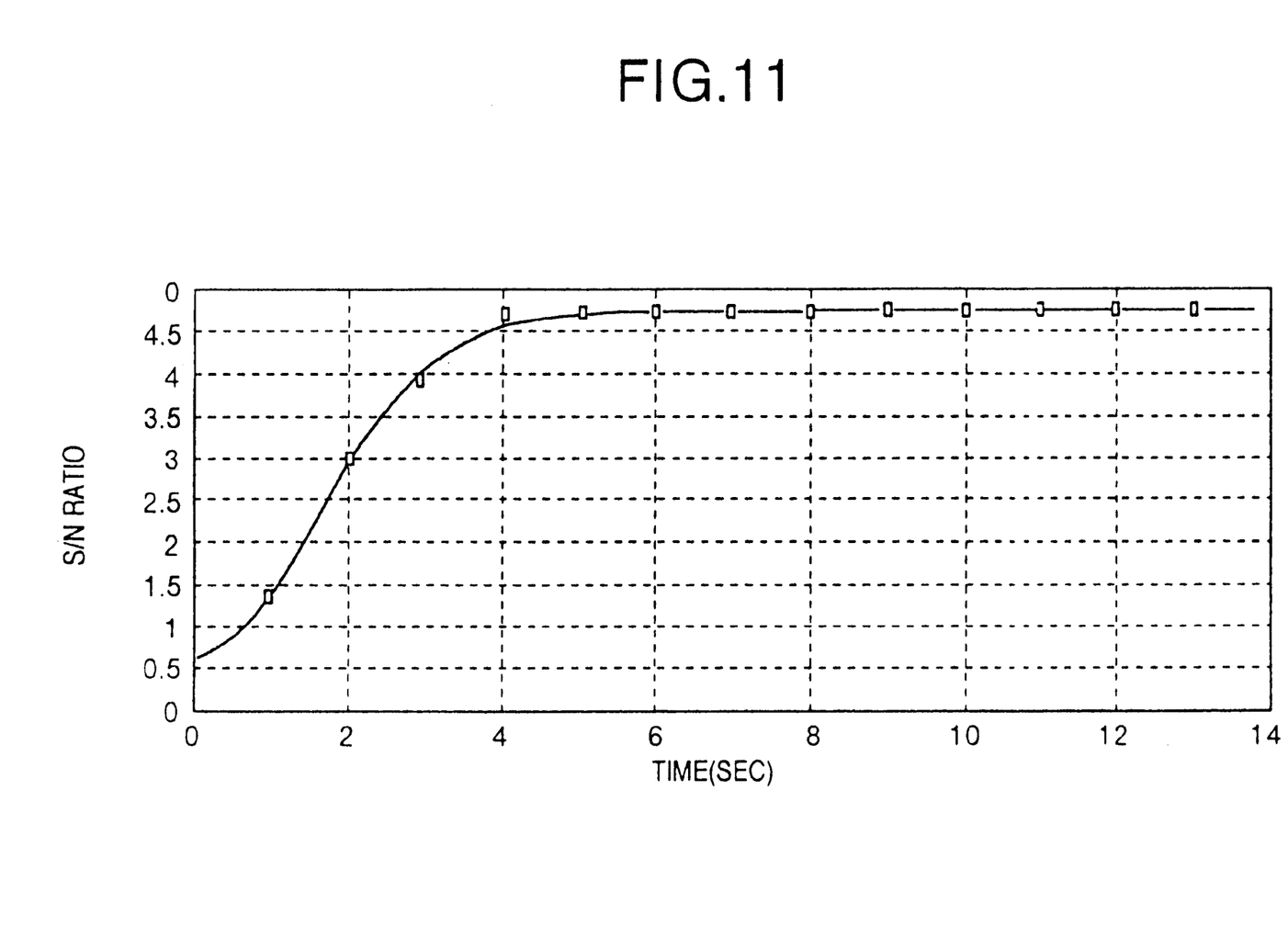
FIG. 11 is a graph showing S/N ratio to time.

The combustion state parameters D1A are found for ranges of 5,000 (rpm), NO LOAD and 6,000 (rpm), NO LOAD, which are examples of ranges which could not be conventionally detected, by using the pitch error-feedback process on the combustion state detector device for an internal combustion engine according to the present invention, and shown in FIGS. 10A and 10B, respectively. In FIGS. 10A and 10B, (a) represents the combustion state parameter D1A by the conventional process, while (b) represents the combustion state parameter D1A by the pitch error-feedback process. In addition, (c) represents the pitch error coefficient pec during the feedback. It is found from the figures that the combustion state parameter which could not be detected in the prior art regardless of the determination level can be detected by the present process with a properly established determination level. In addition, it is understood from (c) that the pitch error coefficient pec is continuously varied to maintain the level of combustion state parameter D1A at non-misfire at a predetermined value. Here, there arises a problem of detectable speed. Thus, the S/N ratio is investigated for time. The results are shown in FIG. 11. From the figure, it takes two seconds until the S/N ratio becomes 3 or more, and it is believed that no problem is caused if there is a converging time of about two seconds (the converging time depends on $\Delta$pec in the flowchart of FIG. 9. It is set to 1.0e-5 in this example).

Figure 12A:
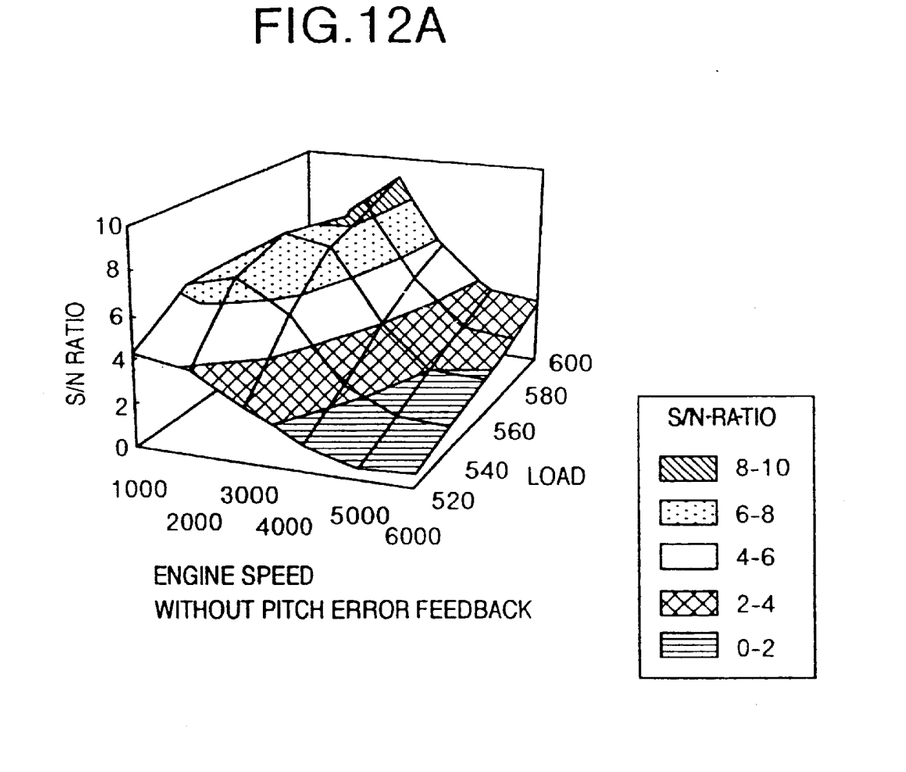
FIGS. 12A and 12B are comparison drawings of S/N ratio over entire range when the pitch error feedback is applied and not applied.
Figure 12B:
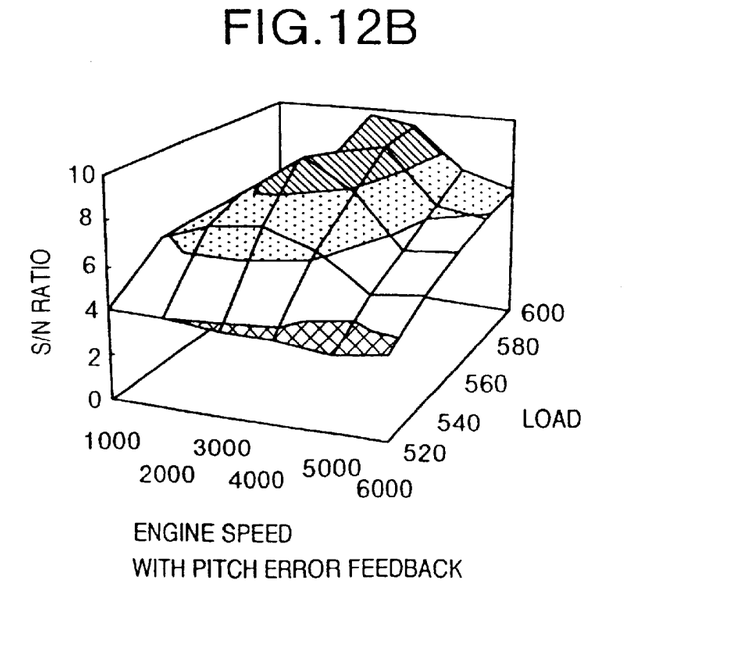

FIGS. 12A and 12B show the results of comparison between the S/N ratio determined by the conventional process and that determined by the present process based on the window passed time TDATA measured over the operable range (entire range). From the figures, it is found that the S/N ratio in the conventional process decreases in low load and high rotation, while the S/N ratio in the present process can be securely maintained at three or more in any range. Thus, it becomes possible to detect misfire over the entire range by using the pitch error-feedback process on the combustion state detector device for an internal combustion engine according to the present invention, and by setting the determination level to an appropriate value.

While the above description is for a case where TDATA of the first and fourth cylinders is multiplied by the pitch error coefficient pec to match the TDATA of the first and fourth cylinders to that of the second and third cylinders, it may be possible for TDATA of the second and third cylinders to be multiplied by the pitch error coefficient pec to match the TDATA of the second and third cylinders to that of the first and fourth cylinders. In such case, in step 901 of the flowchart of FIG. 9, TDATA of the second and third cylinders is multiplied by the pitch error coefficient pec, and the detail in steps 910 and 911 is reversed.

A second embodiment is now described. In the first embodiment, it is arranged to decrease the pitch error coefficient pec when the combustion state parameter D1A for each cylinder is equal to or more or less than predetermined values C1–C4 (the orientation of sign of inequality depending on the cylinder number). On the other hand, the second embodiment is a process to establish a predetermined range, and not to change the pitch error coefficient pec if the combustion state parameter D1A for each cylinder is within this range. In this case, when the combustion state parameter D1A is greater than the upper limit of the predetermined range or less than the lower limit thereof, the pitch error coefficient pec is decreased, otherwise, it is increased. The first embodiment may be considered to be a case where such upper and lower limits are C1–C4.

Figure 13:
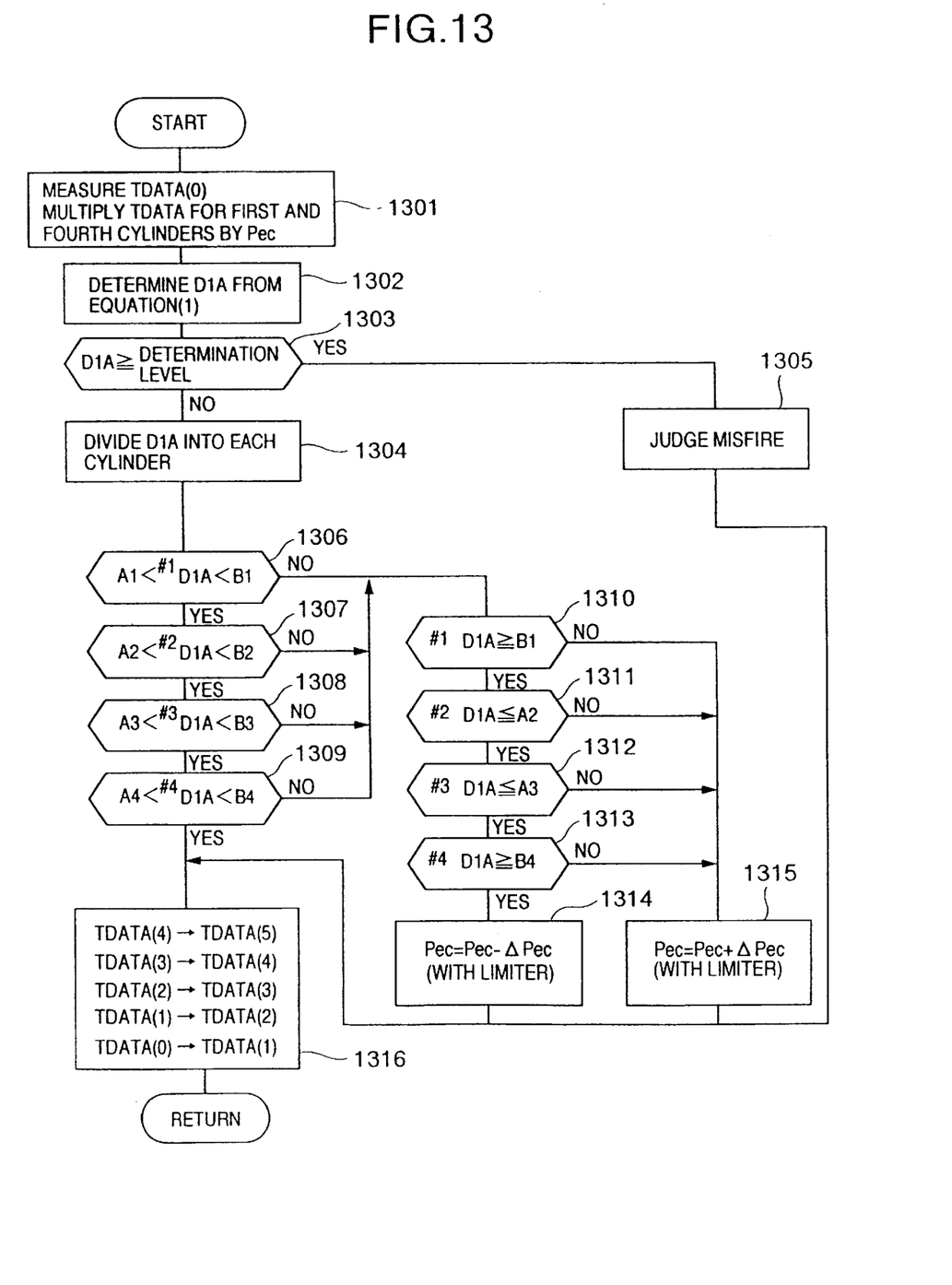
FIG. 13 is a flowchart illustrating a process for detecting misfire in another embodiment of the combustion state detector device for an internal combustion engine according to the present invention.

A flowchart of this process is shown in FIG. 13. The process is performed every ignition. TDATA is measured in step 1301, and TDATA for the first and fourth cylinders is multiplied by the pitch error coefficient pec. Then, in step 1302, the combustion state parameter D1A is determined by Equation (1). Step 1303 compares the combustion state parameter D1A with a misfire determination level, and does not update the pitch error coefficient pec when it is determined to be misfire (step 1305). When it is determined not to be misfire in step 1303, in step 1304 combustion state parameter D1A is divided into each cylinder. Then, if, in steps 1306–1309, the combustion state parameter D1A for each cylinder is within the upper and lower limits (A1–A4, B1–B4), the pitch error coefficient pec is not changed. Otherwise, if, in the next steps 1310–1313, the combustion state parameter for the first cylinder D1A$\geq$upper limit B1, the combustion state parameter for the second cylinder D1A$\leq$lower limit A2, the combustion state parameter for the third cylinder D1A$\leq$lower limit A3, and the combustion state parameter for the fourth cylinder D1A$\geq$upper limit B4 are all satisfied, the pitch error coefficient pec is reduced (step 1314), and, if any one of the conditions is not satisfied, the pitch error coefficient pec is increased (step 1315). Finally, in step 1316, TDATA is shifted by one sampling and stored in a buffer for the next calculation.

In this example also, if TDATA of the second and third cylinders is multiplied by the pitch error coefficient pec as in the first embodiment, TDATA of the second and third cylinders is multiplied by the pitch error coefficient pec in step 1301 in the flowchart, and the detail in steps 1314 and 1315 is reversed.

The above second embodiment is an example in which the dispersion of the combustion state parameters in the normal combustion is corrected to be within a predetermined range. The range is established for detection accuracy required under the conditions of engine (condition for engine speed, condition for load, etc.) from which the combustion state is detected. In other words, in this embodiment, since the conditions for correction to proceed can be established as a target value for reducing the dispersion of combustion state parameters, there is an advantage that more practical correction can be implemented.

In addition, it will be understood that the embodiment described above is preferably prevented from excessive correction or malfunction due to excessive correction by providing an upper or lower limiter for the correction value.

Moreover, since the pitch error of the ring gear or plate causing the dispersion of combustion state parameters is mainly caused from the initial manufacturing error or aging such as ware, there is no need to calculate it every startup of the engine. It may be possible to store in a RAM with a backup capability or a rewritable ROM such as an EEPROM the correction value, and to use it thereafter. It is sufficient to recalculate and store the correction value if the dispersion of combustion state parameters exceeds a preset value. In such case, there is an advantage that load on the microcomputer or the like for calculating the correction value can be reduced when compared with the case where the correction value is calculated at every startup of the engine.

In addition, since, as described earlier, the combustion state of the engine can be accurately detected, the present invention effectively functions in detecting misfire in the engine. That is, since the combustion state parameter exhibits a higher value when the combustion state is deteriorated, and therefore misfire occurs, occurrence of misfire can be easily detected by comparing the combustion state parameter with a predetermined determination level. As well known, if misfire occurs, for a car, for example, not only the driving performance is deteriorated, but also it causes degradation of exhaust gas and damage on catalyst for purifying the exhaust gas. Thus, such shortcomings can be quickly accommodated by detecting misfire, and by, if the misfire rate exceeds a predetermined value, notifying the driver of the fact with a turned-on indicator, and prompting repair.

Here, the level for determining misfire depends on the number of cylinders or torque being generated of the subject car. Thus, the misfire level is desirable to be set to each range of engine conditions which can be divided by the conditions on the engine speed and the load conditions.

The misfire determination level may be established as predetermined times of average of combustion state parameters. This can be attained by establishing it as a proportional constant to the average of combustion state parameters, and setting such proportional constant to each range of the engine state. This approach is no more than to establish a value corresponding to the S/N ratio as the misfire determination level when the average of combustion state parameters is considered as the noise level, and, therefore, it can be said to be more practical. It is matter of course that, in calculating the average of combustion state parameters, some arithmetic technique such that only combustion state parameters in a predetermined range are utilized in the calculation of average is employed to eliminate effect of misfire or the like on the average.

From the above equation on combustion state parameter (Equation (1)), it is found that the average of combustion state parameters in the normal state is "0" or a "value close to 0." Therefore, it may be considered to be meaningless that the misfire determination level is established as a predetermined times value of the average. However, this is a problem which can be avoided by modifying the equation on combustion state parameter. When a predetermined offset value is established, for example, the present invention can be implemented.

The combustion state detector device for an internal combustion engine according to the present invention has the arrangement as described above, and can properly detect the combustion state in an internal combustion engine (especially, existence of misfire) over the entire range where positive torque is generated (low to high rotation ranges).

What is claimed is:

1. A method for detecting combustion state in an internal combustion engine, comprising the steps of using a combustion state parameter calculated from a time signal for a time period during which a crank shaft rotates in a predetermined angle, calculating a correcting quantity for correcting said time signal by comparing a normal combustion value of the combustion state parameter representative of a non-misfire state with one of a predetermined value and a predetermined range, correcting said time signal based on said correction quantity, and calculating the combustion state parameter by using said corrected time signal.

2. The method according to claim 1, further comprising the step of varying the correction quantity for correcting said time signal so that the normal combustion value of the combustion state parameter becomes one of no greater than a predetermined value, and within the predetermined range.

3. The method according to claim 1, further comprising the step of establishing a standard cylinder and an opposite cylinder such that, when the normal combustion value of the combustion state parameter for a cylinder group consisting of said standard cylinder and said opposite cylinder is at a predetermined value or less, and the normal combustion value of the combustion state parameter for the other cylinder groups is at the predetermined value or more, the correction quantity for correcting the time signal for the other cylinder groups is decreased, and otherwise, the correction quantity for correcting the time signal for the other cylinder groups is increased.

4. The method according to claim 2, further comprising the step of establishing a standard cylinder and an opposite cylinder such that, when the normal combustion value of the combustion state parameter for a cylinder group consisting of said standard cylinder and said opposite cylinder is at a predetermined value or less, and the normal combustion value of the combustion state parameters for the other cylinder groups is at the predetermined value or more, the correction quantity for correcting the time signal for the other cylinder groups is decreased, and otherwise, the correction quantity for correcting the time signal for the other cylinder groups is increased.

5. The method according to claim 1, further comprising the step of establishing a standard cylinder and an opposite cylinder such that, when the normal combustion value of the combustion state parameter for a cylinder group consisting of said standard cylinder and said opposite cylinder is at a predetermined value or less, and the normal combustion value of the combustion state parameters for the other cylinder groups is at the predetermined value or more, the correction quantity for correcting the time signal for the cylinder group consisting of said standard cylinder and said opposite cylinder is increased and otherwise, the correction quantity for correcting the time signal for the other cylinder group consisting of said standard cylinder and said opposite cylinder is decreased.

6. The method according to claim 2, further comprising the step of establishing a standard cylinder and an opposite cylinder such that, when the normal combustion value of the combustion state parameter for a cylinder group consisting of said standard cylinder and said opposite cylinder is at a predetermined value or less, and the normal combustion value of the combustion state parameters for the other cylinder groups is at the predetermined value or more, the correction quantity for correcting the time signal for the cylinder group consisting of said standard cylinder and said opposite cylinder is increased and otherwise, the correction quantity for correcting the time signal for the cylinder group consisting of said standard cylinder and said opposite cylinder is decreased.

7. The method according to claim 1, further comprising the step of establishing a standard cylinder and an opposite cylinder such that, when the normal combustion value of the combustion state parameters for all cylinders is within a predetermined range, and, when the normal combustion value of the combustion state parameter for a cylinder group consisting of said standard cylinder and said opposite cylinder is at the predetermined range or less, and the normal combustion value of the combustion state parameters for the other cylinder groups is at the predetermined value or more, the correction quantity for correcting the time signal for the other cylinder groups is decreased, and otherwise, the correction quantity for correcting the time signal for the other cylinder group is increased.

8. The method according to claim 2, further comprising the step of establishing a standard cylinder and an opposite cylinder such that, when the normal combustion value of the combustion state parameters for all cylinders is within a predetermined range, the correction quantity for correcting the time signal for a cylinder group consisting of the standard cylinder and the opposite cylinder is not varied, and, when the normal combustion value of the combustion state parameter for a cylinder groups consisting of said standard cylinder and said opposite cylinder is at the predetermined range or less, and the normal combustion value of the combustion state parameters for the other cylinder groups is at the predetermined value or more, the correction quantity for correcting the time signal for the other cylinder groups is decreased, and otherwise, the correction quantity for correcting the time signal for the other cylinder group is increased.

9. The method according to claim 1, further comprising the step of establishing a standard cylinder and an opposite cylinder such that, when the normal combustion value of the combustion state parameters for all cylinders is within a predetermined range, the correction quantity for correcting the time signal for cylinder groups other than a cylinder group consisting of the standard cylinder and the opposite cylinder is not varied, and, when the normal combustion value of the combustion state parameter for a cylinder group consisting of the standard cylinder and the opposite cylinder is at the predetermined range or less and when the normal combustion value of the combustion state parameter for the cylinder groups other than the cylinder group consisting of the standard cylinder and the opposite cylinder is at the predetermined value or more, the correction quantity for correcting the time signal for the cylinder group consisting of the standard cylinder and the opposite cylinder is increased, and, otherwise, the correction quantity for correcting the time signal for the cylinder group consisting of the standard cylinder and the opposite cylinder is decreased.

10. The method according to claim 2, further comprising the step of establishing a standard cylinder and an opposite cylinder such that, when the normal combustion value of the combustion state parameters for all cylinders is within a predetermined range, the correction quantity for correcting the time signal for cylinder groups other than a cylinder group consisting of the standard cylinder and the opposite cylinder is not varied, and, when the normal combustion value of the combustion state parameter for a cylinder group consisting of the standard cylinder and the opposite cylinder is at the predetermined range or less and when the normal combustion value of the combustion state parameter for the cylinder groups other than the cylinder group consisting of the standard cylinder and the opposite cylinder is at the predetermined value or more, the correction quantity for correcting the time signal for the cylinder group consisting of the standard cylinder and the opposite cylinder is increased, and, otherwise, the correction quantity for correcting the time signal for the cylinder group consisting of the standard cylinder and the opposite cylinder is decreased.

11. The method according to claim 1, wherein, when said combustion state parameter reaches a value indicating misfire in the internal combustion, engine, update of the correction quantity is inhibited in a predetermined duration before and after said value.

12. The method according to claim 1, wherein said correction quantity is provided with an upper limit and/or a lower limit.

13. The method according to claim 1, wherein said correction quantity is backup-stored in a RAM.

14. The method according to claim 1, wherein, if the duration when variation of said correction quantity or the combustion state parameter is within a predetermined range continues for a predetermined duration, said correction quantity is backup-stored in a RAM, and the backed up value is subsequently used as a correction quantity.

15. The method according to claim 1, wherein the step of misfire detection is effected by comparing the combustion state parameter with a determination level.

16. The method according to claim 1, wherein the determination level used for judging misfire is based upon mapped engine speed and loads.

17. The method according to claim 10, wherein the determination level used for judging misfire is a value proportional to an average of the combustion state parameters, and a proportional constant thereof is used as a map of the engine speed and loads.

18. The method according to claim 11, wherein the determination level used for judging misfire is a value proportional to an average of the combustion state parameters, and a proportional constant thereof is used as a map of the engine speed and loads.

19. The method according to claim 1, wherein said calculating correcting quantity step corrects said time signal until the normal combustion value is one of no greater than the predetermined value or is within the predetermined range without recalculation of the correction quantity.

20. The method according to claim 19, wherein a magnitude of a defined relationship of the detected combustion state with respect to the normal combustion value is caused to be no less than another predetermined value.

* * * * *